Oct. 20, 1953 S. FIORINO 2,655,829
WORKHOLDING ATTACHMENT FOR LATHES
Filed Feb. 17, 1950
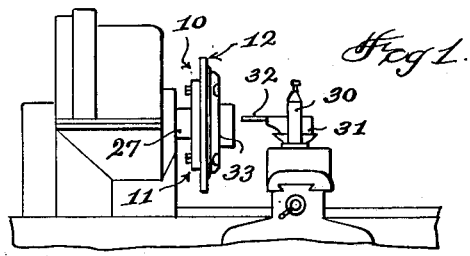
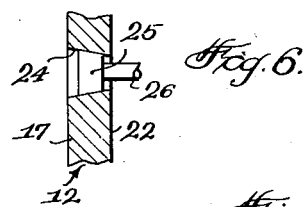
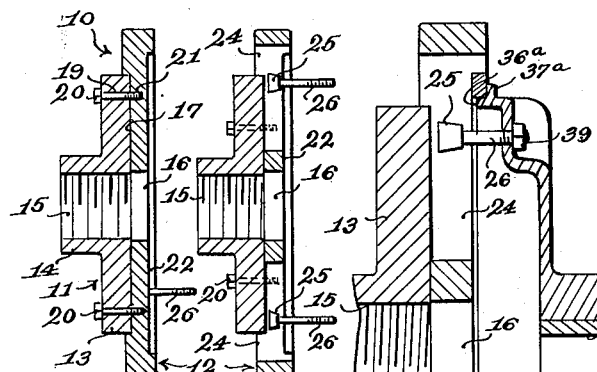
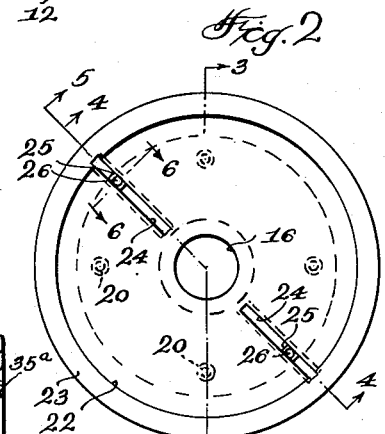
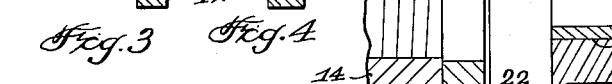
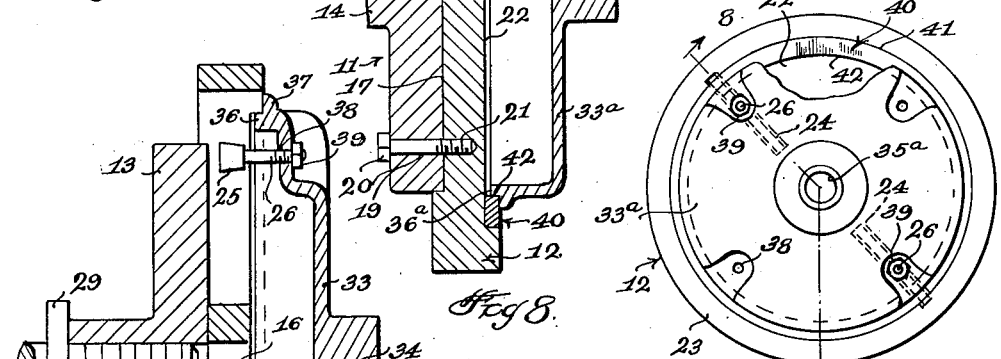
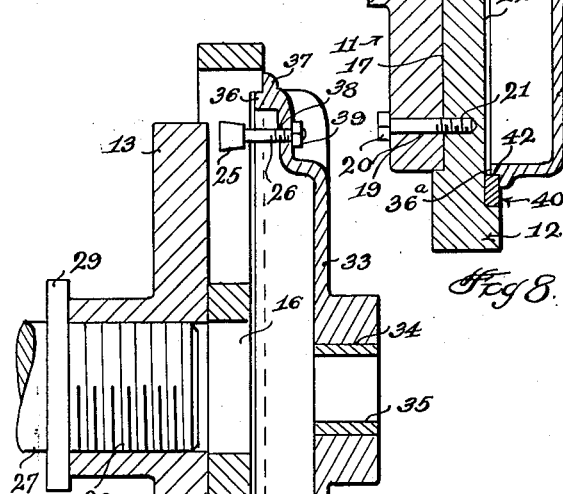
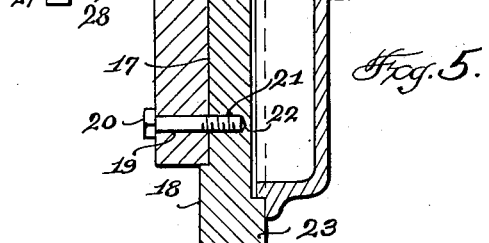
Inventor
Sam Fiorino
By John N. Randolph
Attorney Patented Oct. 20, 1953

2,655,829

UNITED STATES PATENT OFFICE 2,655,829

WORKHOLDING ATTACHMENT FOR LATHES

Sam Fiorino, Du Quoin, Ill.

Application February 17, 1950, Serial No. 144,689

2 Claims. (Cl. 82—40)

This invention relates to a novel work holding attachment for turning lathes primarily adapted for use in supporting an end bell section of an electric motor housing in a perfectly centered position to be revolved by a lathe spindle so that a shaft bushing of the motor housing section may be reamed by an inside cutter which is fixedly supported by a part of the lathe to secure a perfectly reamed bearing which will have a perfect fit so as to provide a correct journal for the motor shaft when said housing section is reassembled with the remainder of the motor housing.

More particularly, it is an aim of the invention to provide a work holder for accomplishing the aforementioned result of extremely simple construction which is capable of being quickly and easily applied to or removed from a lathe spindle and on which an end bell section of a motor housing may be quickly and easily mounted in a perfectly centered position so that the center shaft bearing thereof may be accurately reamed.

Still a further object of the invention is to provide a work holder which is so constructed that a motor housing section supported thereby will in all cases be perfectly centered with respect to the axis of the lathe spindle.

Still a further object of the invention is to provide a work holder having adaptor means for supporting motor housing sections of different diameters and which will insure that any motor housing section, when attached to the work holder will be perfectly centered with respect thereto and to the lathe spindle on which the work holder is mounted.

Various other objects and advantages of the invention will hereinafter become more fully apparent from the following description of the drawing, illustrating a presently preferred embodiment thereof, and wherein:

Figure 1 is a side elevational view showing the invention applied to a conventional lathe and with an electric motor housing section mounted thereon;

Figure 2 is an enlarged front elevational view looking toward the outer side of the work holder and with the motor housing section removed therefrom;

Figures 3 and 4 are diametrical sectional views taken substantially along planes as indicated by the lines 3—3 and 4—4, respectively, of Figure 2;

Figure 5 is an enlarged sectional view taken substantially along a plane as indicated by the line 5—5 of Figure 2 and illustrating the work holder applied to a lathe spindle and supporting a motor housing section;

Figure 6 is a fragmentary sectional view taken substantially along a plane as indicated by the line 6—6 of Figure 2 and on an enlarged scale;

Figure 7 is a view similar to Figure 2 but showing a motor housing section mounted on the work holder and broken away to illustrate an adaptor member employed with the work holder, and Figure 8 is an enlarged sectional view taken substantially along a plane as indicated by the line 8—8 of Figure 7.

Referring more specifically to the drawing, the novel work holder comprising the invention is designated generally 10 and as best illustrated in Figures 3, 4 and 5 includes a lathe spindle engaging section or face plate, designated generally 11 and a work supporting section, designated generally 12.

The spindle engaging section 11 preferably comprises a disk-shaped plate 13 having an annular flange or hub 14 projecting from one side thereof and which has a threaded bore 15 which extends from the outer end of said hub 14 through the plate 13 and which is adapted to threadedly engage the threaded end of the spindle or a turning lathe, as will hereinafter be described.

The work holding section 12 likewise preferably comprises a disk-shaped plate of a larger diameter than the plate 13 and which has a central opening 16 of the same diameter as the bore 15 and which registers therewith when the sections 11 and 12 are connected, as illustrated in Figures 3 and 4. The plate 12 has a recess 17 in its back face 18 which is concentrically disposed relatively to the opening 16 and sized so that the front portion of the plate 13 will snugly fit therein to thereby center the sections 11 and 12. The plate 13 is provided with a plurality of openings 19 for turnably receiving cap screws 20, the heads of which bear against the back side of the plate 13 and the threaded shank ends of which threadedly engage tapped recesses 21 in the plate 12 and which open rearwardly into the recess or depression 17 for detachably securing the sections 11 and 12 together.

As best seen in Figure 2, the plate 12 is provided with a recess 22 in its outer face 23, which is likewise disposed concentric to its opening 16 and to the recess 17 and which is ordinarily larger in diameter than said recess 17. Also, as seen in Figure 2, the work holding section or plate 12 is provided with two radially extending slots 24 which are preferably disposed in diametrical alignment and the ends of which are spaced from the opening 16 and from the periphery of the plate 12. Said slots 24, as best seen in Figure 6, are each wedge-shaped in cross section with the sides thereof converging from the rear face 18 toward the front face 23 or from the recess 17 toward the recess 22. Each slot 24 contains a head 25 of a bolt 26, which bolt head 25 is likewise wedge-shaped, as seen in Figure 6, to prevent the bolt heads from passing through the slots 24 from the rear face 18 to the front face 23. However, it will be readily apparent that the bolt heads 25 may slide radially in the slots 24.

For the purpose of illustrating a preferred application and use of the work holder 10, a part of a conventional turning lathe has been illustrated in Figure 1 including the lathe spindle 27 having a threaded end 28 onto which the threaded bore 15 is screwed and an enlargement 29 adjacent said threaded end 28 against which the outer end of the hub 14 abuts. As illustrated in Figure 1, the lathe also includes a tool post 30 in which a boring bar holder 31 is shown mounted for supporting a boring bar 32 on the tool post 30 and with said boring bar extending toward the spindle end 28, so that the work holder 10 is interposed between the spindle 27 and the boring bar 32.

The bell end section 33 of an electric motor housing is shown in Figures 1 and 5 mounted on the work holder section 12. Such housing sections 33 of electric motors have a central hub portion provided with a central opening 34 which contains a bearing or bushing 35 in which the electric motor shaft is journaled. After such bearing or bushing 35 has become worn, it is replaced by a new bearing or bushing 35 which is secured therein by a press fit engagement. Ordinarily the bore of the new bushing is not a true circle and it is therefore necessary to ream out the bore so that a proper fit and journal for the motor shaft will be provided. The work holder 10 is provided to insure that in accomplishing this reaming operation the bearing 35 will be reamed in a perfect circle and which can only be accurately accomplished if the axis of the bearing 35 is in axial alignment with the lathe spindle 27. The housing section 33 has an open annular end 36 and the recess 22 of the plate 12 is sized to snugly receive said open end 33 and so that the housing section flange 37, which projects outwardly from the periphery of said housing section will abut against the front face 23. The two bolts 26 are adjusted radially in the slots 24 to align said bolts with the ordinary bolt openings 38, by which the housing section 33 is normally connected to the remainder of a motor housing, and said bolts 26 are then displaced outwardly of the plate 12 and so that their threaded ends will extend outwardly through the openings 38. Nuts 39 are attached to the threaded bolt ends and are tightened to initially draw the bolt heads 25 into wedging engagement in the slots 24 and for thereafter securely clamping the housing section 33 to the work supporting plate 12, and as previously pointed out, it will thus be readily apparent that said housing section 33 due to the engagement of its rim portion against the annular wall of the recess 22, will be positively centered with respect to the work holder 10 and consequently with respect to the lathe spindle 27. Accordingly, when the spindle 27 is revolved for rotating the work holder 10 and housing section 33 therewith and when the boring bar 32 is advanced into the opening of the bushing 35, the bore of said bushing 35 will be reamed in a true circle.

Assuming that the recess 22 is formed of a diameter to snugly fit a housing section 33 of maximum size or diameter, as motor housings are made of different diameters, the work holder 10 also includes a plurality of adaptor rings, one of which is illustrated in Figures 7 and 8 and designated generally 40. The adaptor ring 40 has an outer diameter substantially corresponding to the diameter of the recess 22, so that the adaptor ring 40 will snugly fit into the recess 22 and with its periphery 41 engaging against the annular wall of the recess 22. The inner diameter of the ring 40 corresponds to the outer diameter of a motor housing section 33a so that the periphery of the open end 36a of said housing section will abut against the inner wall 42 of the adaptor ring 40, as best illustrated in Figure 8. The motor housing section 33a is secured in the same manner as the motor housing section 33 by the bolts 26 and nuts 39 so that a bushing 35a, contained in the bore 34a may be reamed to provide a perfect circle. Obviously, adaptor rings of different internal diameters may be provided for accommodating other motor housing sections of different sizes, all of which rings will have the same external diameter.

Various modifications and changes are contemplated and may obviously be resorted to, without departing from the spirit or scope of the invention as hereinafter defined by the appended claims.

I claim as my invention:

1. A work holding attachment for a turning lathe, comprising an inner section having means to demountably support the work holding attachment on a lathe spindle, an outer section comprising a work supporting plate having a rear face provided with a center recess receiving snugly therein a portion of said inner work holding section, fastening means detachably connecting the sections for rotation as a unit and centering the outer work holding plate relatively to the axis of the lathe spindle, said work supporting plate having an outer face provided with a recess concentrically disposed relatively to the axis of the lathe spindle and adapted to receive therein the open end of an electric motor housing end section and to support said section against radial movement in any direction relatively to said work supporting plate, and threaded bolts anchored in said work supporting plate and extending outwardly from the recess of the outer face thereof through fastening receiving openings of the motor housing section and having nuts detachably engaging the outer ends of said bolts and bearing against the outer side of the motor housing section for retaining the open end of the motor housing section in engagement with the recess of the outer face of the work supporting plate to center the motor housing section relatively to the axis of the lathe spindle, said work supporting plate having a plurality of radially extending slots, each of said slots being wedge-shaped in cross section and converging in width toward the outer face of the plate, one of said bolts being mounted in each of said slots, each of the bolts having a wedge-shaped head fitting the slot and sized to prevent the bolt from being displaced out of engagement with the plate and through its outer face, said bolts being adjustable radially of the plate and longitudinally of the slots to positions to engage openings of the housing section spaced different distances from its center, and said bolt heads being drawn into wedging engagement in the slots by the nuts engaging the bolts for adjustably anchoring the bolts in the plate.

2. A work holding attachment for turning lathes comprising a work supporting plate, means for detachably connecting said attachment to a lathe spindle for rotation therewith, said plate having a recess in its outer side disposed concentric with the axis of the lathe spindle and adapted to receive therein a portion of the periphery of the open end of an end section of an electric motor housing and snugly engaging said periphery portion to mount the motor housing section coaxially with the lathe spindle, said plate having radially extending slots of wedge-shaped cross section converging in width toward the outer side of the plate, bolts projecting outwardly from the recess portion of the front face of the plate and extending through fastening receiving openings of the motor housing section, and nuts engaging the bolts and bearings against the outer side of the motor housing section for detachably securing the motor housing section to said work supporting plate, said bolts having wedge-shaped heads fitting said slots and radially adjustable therein, said bolt heads being wedged in the slots by tightening of the nuts against the motor housing section to anchor the bolt heads in different radially adjusted positions in the plate.

SAM FIORINO.

References Cited in the file of this patent

UNITED STATES PATENTS

| Number | Name | Date |
|---|---|---|
| 229,131 | Hill | June 22, 1880 |
| 866,695 | Taussig | Sept. 24, 1907 |
| 1,292,735 | Elliott | Jan. 28, 1919 |
| 1,414,190 | Koehler | Apr. 25, 1922 |
| 1,491,332 | Brown | Apr. 22, 1924 |
| 2,208,879 | Blazek | July 23, 1940 |
| 2,469,630 | Braun | May 10, 1949 |

FOREIGN PATENTS

| Number | Country | Date |
|---|---|---|
| 22,837 | Great Britain | of 1910 |
| 333,122 | France | June 16, 1903 |